United States Patent [19]

Matsumoto

[11] 4,250,547

[45] Feb. 10, 1981

[54] INFORMATION PROCESSING APPARATUS CAPABLE OF EFFECTING PARALLEL PROCESSINGS BY USING A DIVIDED COMMON BUS

[75] Inventor: Keiji Matsumoto, Tokyo, Japan

[73] Assignee: Nippon Electric Co., Ltd., Tokyo, Japan

[21] Appl. No.: 937,371

[22] Filed: Aug. 28, 1978

[30] Foreign Application Priority Data

Aug. 27, 1977 [JP] Japan ................................ 52/103362

[51] Int. Cl.³ .............................................. G06F 13/00
[52] U.S. Cl. ........................... 364/200; 340/146.3 MA
[58] Field of Search ... 364/200 MS File, 900 MS File; 340/146.3 MA

[56] References Cited

U.S. PATENT DOCUMENTS

| | | | |
|---|---|---|---|
| 3,226,692 | 12/1965 | Fuller et al. | 364/200 |
| 3,274,561 | 9/1966 | Hallman et al. | 364/200 |
| 3,411,139 | 11/1968 | Lynch et al. | 364/200 |
| 3,651,473 | 3/1972 | Faber | 364/200 |
| 3,916,380 | 10/1975 | Fletcher et al. | 364/200 |
| 3,984,819 | 10/1976 | Anderson | 364/200 |
| 4,158,834 | 6/1979 | Nakanishi et al. | 340/146.3 MA |

*Primary Examiner*—Leo H. Boudreau
*Attorney, Agent, or Firm*—Sughrue, Rothwell, Mion, Zinn and Macpeak

[57] ABSTRACT

An information processing apparatus of the type in which information is transmitted among a plurality of information handling units such as a central processing unit, memories, input-output units and the like through a common bus is disclosed. The common bus is divided into first and second data buses with the central processing unit connected to the first data bus and at least one memory unit and at least one input-output unit connected to the second data bus. Gating units are coupled between the first and second data buses to transfer data between the first and second data buses. Since the common bus can be divided by the gating units according to demand into the first and second data buses, the information processing apparatus is capable of processing a plurality of programs in parallel.

9 Claims, 14 Drawing Figures

INFORMATION PROCESSING APPARATUS CAPABLE OF EFFECTING PARALLEL PROCESSINGS BY USING A DIVIDED COMMON BUS

BACKGROUND OF THE INVENTION

The present invention relates to an information processing apparatus, and more particularly to an information processing apparatus of the type in which information is transmitted among a plurality of information handling units such as a central processing unit (hereinafter referred to as a CPU), memories, input-output units and the like through a common signal transmission path (hereinafter referred to as a bus).

A conventional data processing system such as a microcomputer usually includes a plurality of information handling units such as a CPU, memories, and input-output units and, the individual information handling units are coupled to a single data bus, the data being transmitted to and from the individual units through the single data bus. When information handling units designated by a CPU employ the data bus, the remaining non-designated information handling units must stop their processing. In particular, a CPU must always stop its operation during the time when the data bus is employed by the other units, even if processing to be performed in the CPU at that time requires no use of the data bus. Therefore, waiting time is inevitable in the prior art system with the single data bus, which unnecessarily lengthens the processing time.

SUMMARY OF THE INVENTION

The object of the present invention is therefore to provide an information processing apparatus with the reduced processing time which effectively utilizes a common bus coupling the individual information handling units.

Another object of the present invention is to provide an information processing apparatus which is capable of processing a plurality of programs in parallel by enabling the common bus to be divided according to demand into a plurality of bus portions.

The information processing apparatus of the present invention comprises a plurality of information handling units including a central processing unit (CPU), a memory such as random access memory (RAM) or a read only memory (ROM) for storing programmed instructions, a main memory for storing the data or preset instructions, and input-output units, a common bus coupled to each of the plurality of information handling units, at least one drive unit inserted in the common bus to divide the bus into two or more portions and connect the portions into a single bus line, and a control unit for controlling the drive unit.

According to thus constructed information processing apparatus of the present invention, by controlling the drive unit, the common bus can be used as a plurality of buses each connecting information handling units or as a single common bus connecting all the information handling units. For example, when data is to be transferred between the CPU and ROM and the other data is to be transferred between the input-output unit and the memory, the two data can be transferred simultaneously in parallel between the CPU and the ROM, and between the input-output unit and the main memory by dividing the bus into two portions; one being coupled to the CPU and the ROM and the other being coupled to the input-output unit and the main memory by controlling the drive units. The common bus is thus used as an exclusive bus for connecting only those units between which data is to be transferred. Therefore, the inconvenience that the CPU must always stop its operation which has been encountered with the conventional apparatus when the data is transferred between the input-output unit and the main memory, is eliminated, making it possible to perform operations in parallel between the units coupled to the respective bus portions divided by the drive unit. Accordingly, the processing time is greatly reduced, and the processing speed of the information processing apparatus is greatly increased.

The drive unit may include a bidrectional gate connected between a data bus portion coupled to a CPU and another data bus portion coupled to peripheral units, and the control unit may include means coupled to the CPU for detecting whether or not data transfer between the two data bus portions is necessary and means coupled to the gate for making the gate "on" or "off" in response to the output of the detecting means. However, it is favorable that a couple of unidirectional gates are connected between the two data bus portions in parallel but in the opposite directions and that the control unit includes a first detecting means for detecting whether data transfer is demanded between the two data bus portions, a second detecting means for detecting the direction of the demanded data transfer, that is, whether the data should be transferred from the first data bus portion to the second data bus portion or from the second to the first, and means for making any one of the two unidirectional gates "on" in response to the outputs of the two detecting means. Another drive unit may be provided between a third data bus portion and one or both of the first and second data bus portions. A common address bus may be also divided into two or more portions and one or more gates preferably a unidirectional gate, may be connected between the address bus portons. For example, a unidirectional gate may be connected between a first address bus portion coupled to a CPU and a second address bus portion coupled to peripheral units etc. in this direction and made conductive when data transfer employing the second bus portion is demanded.

BRIEF DESCRIPTION OF THE DRAWINGS

The present invention will be described in more detail with reference to embodiments shown by way of the accompanying drawings, in which.

DETAILED DESCRIPTION OF THE INVENTION

Figure 1:
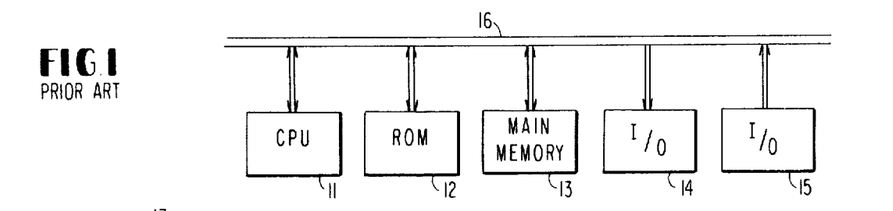
FIG. 1 is a block diagram showing a conventional information processing apparatus employing a common bus.

Referring to FIG. 1, a conventional information processing apparatus is so constructed that a CPU 11 which processes the data, prepares addresses and transmits the processed data, a read-only memory 12 (herein referred to as an ROM) which stores the program for specifying the processing functions of the CPU 11 or other control unit and which reads out the programmed instruction stored in the address specified by the CPU 11, an input-output unit 14 which receives the data from the external control equipment (such as a keyboard, line printer, magnetic tape, etc.) and which sends the data to the CPU 11, a memory etc. (the input-output unit 14 is capable of transferring the data to an other input-output unit 15 having similar functions), and a main memory 13 which stores the data transferred from the input-output units 14, 15 or from CPU 11 or ROM 12 and which stores the preset data with instructions, are all coupled to a single common bus 16. With such an information processing apparatus, however, when the data is to be transferred between the CPU 11 and the ROM 12, or between the ROM 12 and the main memory 13, or between the CPU 11 and the input-output unit 15 through the common bus 16, the bus 16 is assigned only to the units specified by the control signals from the CPU 11 (for example, to the input-output unit 15 and the main memory 13), whereby other information handling units are temporarily interrupted with respect to their processing operation because they cannot use the bus 16, and had to wait until the bus 16 becomes open. That is, when the input-output unit 15 demands the CPU 11 for the use of the bus 16, the CPU 11 has to order the input-output unit 15 to wait for the processing until the instruction now being preformed is finished or has to stop the performance of the instruction to provide the common bus 16 for the input-output unit 15. Then, after the input-output unit 15 has finished the prosecution of the data-transfer using the common bus 16, the CPU 11 has to resume the prosecution of the interrupted operation. Therefore, so far as the information handling units (such as input-output units 14, 15) having high priority for demanding the use of the common bus are using the common bus 16, other information processing units (such as the CPU 11) having low priority must always stop their operation. Consequently, even when the instruction being prosecuted in the CPU 11 is of a nature that does not require the use of the common bus 16, the CPA 11 must necessarily stop its operation. Therefore, the conventional information processing apparatus has a defect in that the processing times in the CPU 11 and in the apparatus are unnecessarily lengthened.

Now, preferred embodiments of the invention will be described with reference to FIGS. 2 to 8.

In general, there are many information handling units to be connected to a common bus. However, in the illustrated embodiments, the information processing apparatus including typical information handling units with the most common functions is used.

Figure 2:
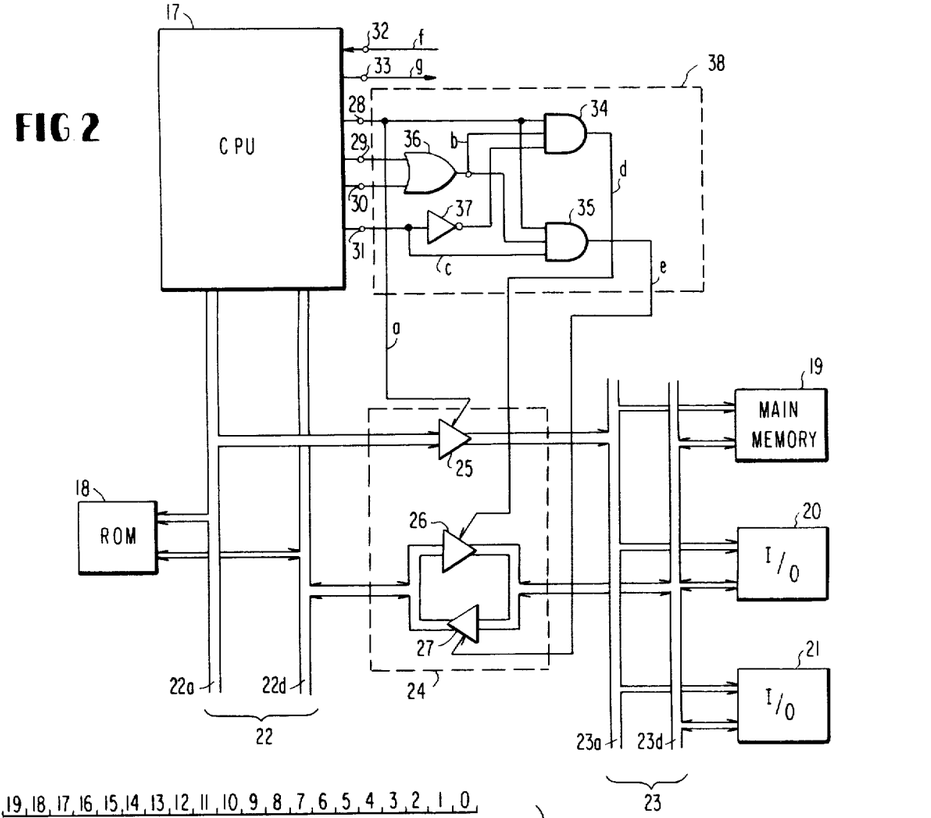
FIG. 2 is a block diagram showing an information processing apparatus according to one embodiment of the present invention.

Referring to FIG. 2, the information processing apparatus according to an embodiment of the present invention comprises a central processing unit (CPU) 17 including (but not shown) a timing signal generator for controlling the operation timings of the individual units, an address preparation means, a instruction decoder, an arithmetic logic operation circuit, an address decoder and controller, and a register for temporarily sorting the data. The CPU 17 further includes control terminals 28 to 33. A read-only memory (ROM) 18 stores programmed instructions which are to be read out from address area specified by the CPU 17. Input-output units 20, 21 send and receive the data to and from peripheral equipments such as a line printer, magnetic tape, magnetic disk, and keyboard. A main memory 19 stores the data fed from the input-output units 20, 21 or from the CPU 17 or ROM 18, or stores preset programmed commands.

The apparatus of the embodiment of the present invention further comprises a first bus portion 22 to which the CPU 17 and the ROM 18 are coupled and a second bus portion 23 to which the main memory 19 and input-output units 20 and 21 are compled. Thus, a common bus can be divided into an exclusive bus 22 for interconnecting the CPU 17 and the ROM 18, and an exclusive bus 23 for interconnecting the main memory 19 and the input-output units 20 and 21. The first and second bus portions 22 and 23 consist of first and second address bus portions 22a and 23a which unidirectionally transfer address signals and first and second data bus portions 22d and 23d which bidirectionally transfer data signals. A drive unit 24 is coupled between the two bus portions 22 and 23, and a control unit 38 is provided between the CPU 17, particularly its terminals 28 to 31, and the drive unit 24. By controlling the drive unit 24, it is allowed to use the exclusive buses 22 and 23 as a single common bus or as two exclusive buses. The drive unit 24 is controlled by the control unit 38. Before explaining the operation of the apparatus of FIG. 2, the constructions of the CPU 17, the control unit 38 and the drive unit 24 will be described below.

Figure 3:
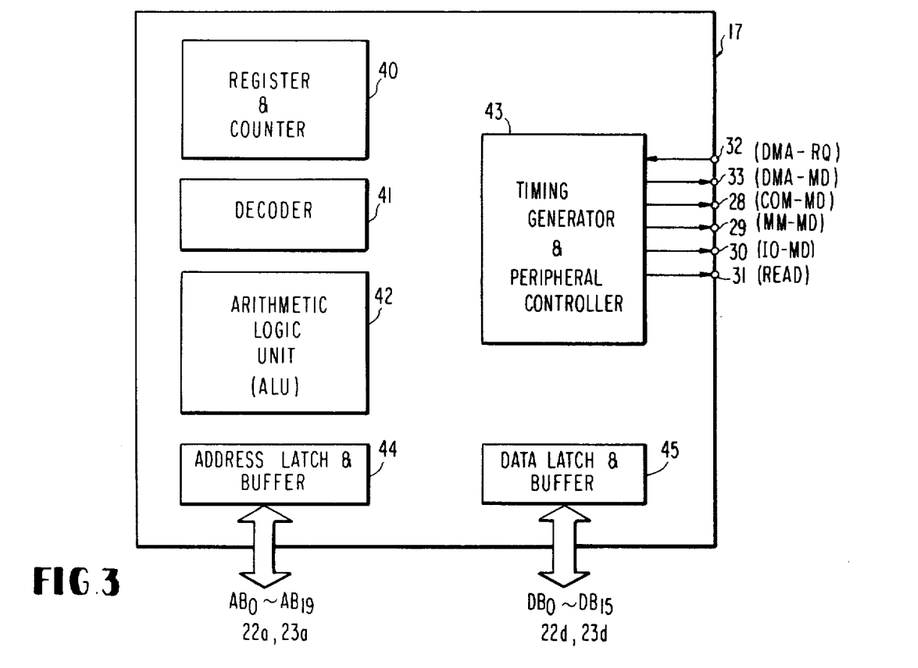
FIG. 3 is a functional block diagram showing control parts and memory parts accomodated in the CPU shown in FIG. 2.

Referring to FIG. 3, the CPU 17 comprises a register and counter part 40 including a program counter for temporarily storing the data and preparing the address, a decoder part 41 for decoding the address and the programed instruction, an arithmetic logic unit (ALU) part 42 for performing the arithmetic logical operation according to the programmed instruction, a timing generator and peripheral controller part 43 which produces timing signals to the individual processing units, produces control signals to the peripheral equipment (a line printer, a magnetic disk, a keyboard, etc.), and receives the control signals from the peripheral equipment, an address latch and buffer part 44 which introduces and produces address signals, and a data latch and buffer part 45 which introduces and produces data signals. The embodiment of the present invention, employs address buses ($AB_0$-$AB_{19}$) 22a, 23a for transferring in parallel the address signals consisting of 20 bits, and data buses ($DB_0$-$DB_{15}$) 22d, 23d for transferring in parallel the data signals consisting of 16 bits. Terminals 28 to 33 of the CPU 17 coupled to the timing generator and peripheral controller 43 have the following functions:

Terminal 28 produces a common mode signal (COMMD) which becomes active when the CPU 17 transfers the data through the second exclusive bus 23.

Terminal 29 produces a main memory mode signal (MM-MD) which becomes active when the data is to be transferred between the CPU 17 and the main memory 19.

Terminal 30 produces an input-output mode signal (IO-MD) which becomes active when the data is to be transferred between the CPU 17 and the input-output units 20, 21.

Terminal 31 produces a read mode signal (READ) which determines in regard to whether the data should be transferred from the CPU 17 to the exclusive bus 23 (i.e., main memory 19, input-output units 20, 21) or the data of the exclusive bus 23 should be introduced into the CPU 17 (according to this embodiment. The data on the exclusive bus 23 is written in the CPU 17 when the level of the terminal 31 is "1", and the data is transferred from the CPU 17 to the exclusive bus 23 when the level of the terminal 31 is "0").

Terminal 32 introduces a DMA request signal (DMA-RQ) which is a signal for demanding the use of the bus (DMA/Dynamic Memory Access) to the CPU 17 when it is desired to use the common bus for the peripheral equipments (including input-output units 20, 21).

Terminal 33 produces a DMA mode signal (DMA-MD) which is a response signal (permission signal) which the CPU 17 permits the use of the common bus for the peripheral equipment, when a DMA request signal is generated.

Referring to FIG. 2, the control unit 38 which is connected to each of the abovesaid terminals 28 to 31 and control the drive unit 24 comprises three-input AND gates 34 and 35, two-input OR gate 36 and an inverter 37. The MM-MD terminal 29 and the IO-MD terminal 30 are connected to each of the input terminals of the AND gates 34, 35 via the OR gate 36. Further, the COM-MD terminal 28 is connected to input terminals of the AND gates 34, 35 in parallel, while the READ terminal 31 is connected to an input terminal of the AND gate 35 and to the inverter 37, and a READ signal inverted by the inverter 37 is fed to the remaining input terminal of the AND gate 34.

Referring further to FIG. 2, the drive unit 24 comprises three unidirectional transfer gates 25 to 27. The address bus 22a of the first exclusive bus 22 and the address bus 23a of the second exclusive bus 23 are connected together by means of the transfer gate 25 which is controlled by the CPU 17 via an MM-MD signal line a. Address information of the first exclusive bus 22a is transferred to the second exclusive bus 23a when the level of the signal line a is "1". The data bus 22d of the first exclusive bus 22d and the data bus 23d of the second exclusive bus 23 are connected to each other by means of transfer gates 26, 27. Here, the gate 26 is controlled by an output signal d from the AND gate 34 of the control unit 38 and connects the data bus 22d with the data bus 23d when its level is "1", while the transfer gate 27 is controlled by an output signal e of the AND gate 35 of the control unit 38 and connects the data bus 23d with the data bus 22d when its level is "1".

The operation of the information processing apparatus according to the embodiment of the present invention is illustrated below.

When the CPU 17 accesses the second exclusive bus 23, a COM-MD signal a ("1" level) from a terminal 28 of the CPU 17 is fed to the transfer gate 25, the bus 22a is connected the bus 23a to transfer the address signals from the bus 22a to the bus 23a. And when the CPU 17 accesses the main memory 19 and the input-output units 20, 21, a "1" level signal is produced from the terminals 29 and 30. This high level is fed to the AND gates 34 and 35 via the OR gate 36. Further, when the CPU 17 receives the data from the main memory 19 or the input-output units 20, 21, a READ signal is produced from the terminal 31 and is fed to the AND gate 35 as well as to the AND gate 34 via the inverter 37. Here, when the output line d of the AND gate 34 acquires the high level, the transfer gate 26 is operated, and thereby the bus 22d is connected with the bus 23d. On the other hand, the output line e of the AND gate 35 acquires the high level, the transfer gate 27 is rendered operative, whereby the gate 27 is opened to connect the data bus 22d with the bus 23d. Further, when peripheral equipment (such as main memory 19, input-output units 20, 21, etc.) use the exclusive bus 23 irrespective of the processing of the CPU 17, a DMA-RQ signal requesting the use of the exclusive bus 23 is fed to the CPU 17 via the terminal 32, whereby the CPU 17 detects that the signal line f is of the high level. Then, if the peripheral equipment may use the common bus 23, a DMA-MD signal is produced from the terminal 33 of the CPU 17 for the peripheral equipment.

Figure 4:
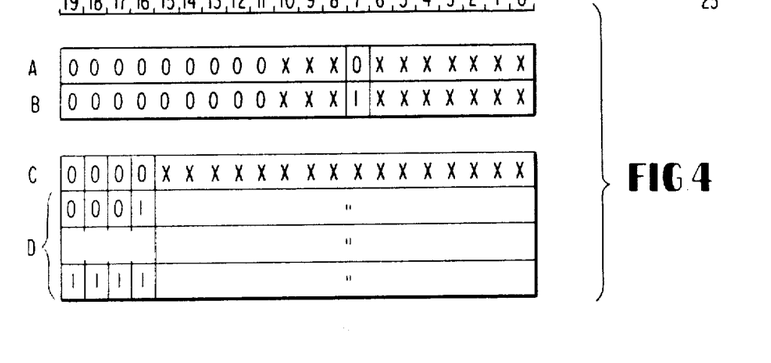
FIG. 4 is a diagram showing the data of each of bits of address signals.

According to the embodiment of the present invention, whether the peripheral equipment (such as the ROM 18) connected to the bus 22 is addressed or the peripheral equipment (such as the main memory 19, the input-output units 20, 21) connected to the exclusive bus 23 is addressed is determined by the contents of the address information produced from the CPU 17. The relation is shown in FIG. 4. When the seventh bit of the address information is "0" as shown by the diagram A of FIG. 4, the input-output unit connected to the exclusive bus 22 is addressed. On the other hand, when the seventh bit of the address information is "1" as shown by the diagram B, the input-output unit connected to the bus 23 is addressed. Further, when the 16th to 19th bits are all "0" as shown by the diagram C, the memory unit connected to the bus 22 is addressed. On the other hand, when at least one bit of the 16th to 19th bits is not "0" as shown in the diagram D, the memory connected to the bus 23 is addressed. Referring to FIG. 4, a mark X indicates that no difference is made irrespective of whether the data may acquire the level "0" or "1".

In this embodiment, so far as the CPU 17 accesses the exclusive bus 22, the MM-MD signal a does not acquire the high level, whereby the exclusive bus 23 is offered to the units other than the CpU. In this time, if the DMA-RQ signal f acquires the high level, the CPU 17 produces a DMA-MD signal for the peripheral units to indicate that the exclusive bus 23 may be used for them (such as main memory 19, input-output units 20, 21, etc.), and at the same time, the CPU 17 continues to perform its own processing operation. Further, when the CPU 17 accesses the exclusive bus 23, the COM-MD signal a acquires the high level and the bus 22 is connected with the bus 23, whereby the address information from the CPU 17 is fed to the peripheral equipment and the data is transmitted between the CPU 17 and the peripheral equipment through the data bus. Here, if the DMA-RQ signal f acquires the high level and is fed to the CPU 17, the CPU 17 does not accept its DMA-RA signal. However, after a machine cycle in which the CPU 17 access to the exclusive bus 23 is finished, the CPU 17 receives the DMA-RA signal and offers the bus 23 for the peripheral units by shutting the transfer gates 25, 26 and 27. According to the embodiment of the present invention, when it is desired to use the exclusive bus 23 simultaneously for both the CPU 17 and the peripheral equipment, the peripheral equipment can use the bus 23, in order to ease the programming operation.

As mentioned above, according to the present invention, the common bus can be used as both a single bus connecting with all of the information units in the apparatus and the divided bus connecting any information units in the apparatus by inserting a drive unit on the common bus, and so far as the CPU 17 uses only the exclusive bus 22 in FIG. 2, the peripheral equipments may use the bus 23 separate from the bus 22. Owing to the present invention, the CPU 17 and the peripheral equipment may operate simultaneously and in parallel, thereby enabling the bus to be effectively utilized, execution time of the CPU to be reduced, and the processing times of the units other than the CPU to be shortened.

The setup of the information processing apparatus according to the embodiment of the present invention is illustrated in further detail.

Figure 5A:
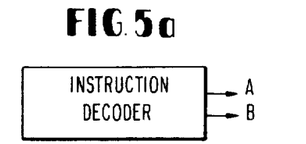
FIGS. 5(a), (b) and (c) are circuit diagrams showing how the output signals from the control and memory parts in FIG. 3 are generated.
Figure 5B:
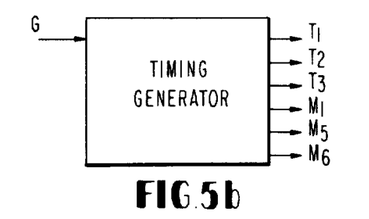
Figure 5C:
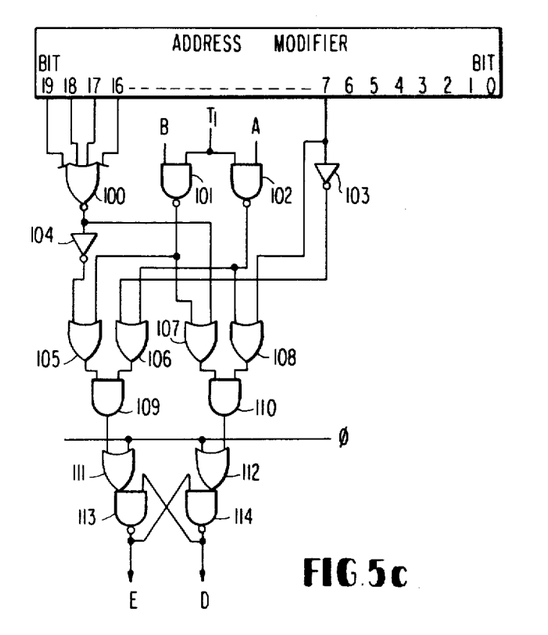

FIG. 5 shows more clearly control signals produced from each of the control parts in the CPU 17 in FIG. 2. FIG. 5(a) shows the instruction decoder which produces at terminal A the high level signal when the CPU 17 accesses input-output units 20, 21, and at terminal B produces the high level signal when the CPU 17 accesses the main memory 19. FIG. 5(b) shows the timing generator which produces control signals wherein $T_1$, $T_2$ and $T_3$ represent state signals, and $M_1$, $M_5$ and $M_6$ represent machine cycle signals. The FIG. 5(c) shows a circuit for producing a signal which determines whether the CPU17 uses the exclusive bus 22 or the exclusive bus 23, and addresses the main memory 19 or the input-output units 20, 21 by the address information produced from an address modifier. Referring to FIG. 5(a), the address signals of 16th to 19th bits are fed to input terminals of a NOR gate 100, respectively, and the output of the NOR gate 100 is fed to an OR gate 105 via an OR gate 107 and an inverter 104. The signal of the 7th bit is fed to an OR gate 106 via an OR gate 108 and an inverter 103. A state signal $T_1$ produced by the timing generator and selection signals A, B produced by the instruction decoder are fed to NAND gates 101 and 102, and the outputs of the NAND gates 101 and 102 are fed to OR gates 105 to 108. The OR gates 105, 106 and 107, 108 are connected to AND gates 109 and 110, and the outputs of the AND gates 109 and 110 are fed to NAND gates 113 and 114 via OR gates 111 and 112. A clock signal $\phi$ is fed to the other input terminals of the OR gates 111 and 112, and the output of a NAND gate 113 is fed back to the input terminal of the NAND gate 114, and the output of the NAND gate 114 is fed back to the input terminal of the NAND gate 113 to form a flip-flop. As a result, by combining the address signal and the selection signals A, B from the instruction decoder, a signal E for accessing the exclusive bus 22 and a signal D for accessing the exclusive bus 23 can be produced.

Furthermore, the circuits of diagrams shwon in FIGS. 6(a) to 6(e) are connected to the individual terminals 28 and 32 (refer to FIG. 2) and contained in the peripheral control part 45 in FIG. 3.

Figure 6A:
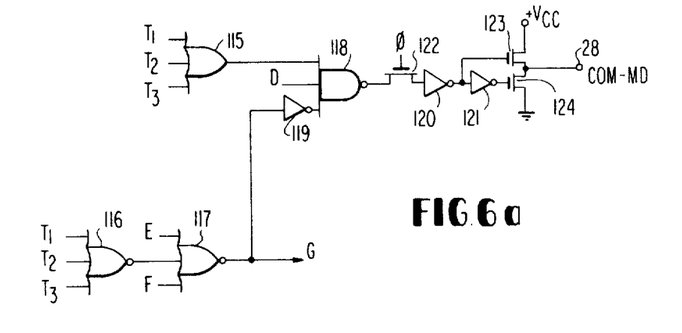
FIGS. 6(a), (b), (c), (d) and (e) are circuit diagrams showing transfer means that the output signals in FIG. 5 are transmitted to the terminals in the CPU.

The diagram of FIG. 6(a) shows means for producing a COM-MD signal from the terminal 28, wherein the outputs of the OR gate 115 and NOR gate 116 to which will be fed state signals $T_1$, $T_2$ and $T_3$ produced from the timing generator 43 in FIG. 3, are fed to the NAND gate 118 and the NOR gate 117, respectively. To the NOR gate 117 are fed the selection signal E of the exclusive bus 22 and the permission signal F of using the exclusive bus 23, and the output of the NOR gate 117 is fed to the timing generator as a signal G for controlling the timing generator and is further fed to the NAND gate 118 via the inverter 119. To the other input terminal of the NAND gate 118 is fed the requesting signal D for using the exclusive bus 23, and the output of the NAND gate 118 is fed to an inverter 120 via a transfer gate 122 which is controlled by a clock signal $\phi$ produced from an external circuit such as a crystal oscillator. The output of an inverter 120 is fed to the gate electrode of an NMOS transistor 123 and to the gate electrode of an NMOS transistor 124 via an inverter 121. Each of the collector electrodes of the NMOS transistors 123 and 124 are respectively connected to a positive terminal of the power supply and to ground potential, respectively, and the emitter electrodes of the two transistors are connected to the output terminal (CMO-MD) 28. When the signal D of the produced by the circuit of FIG. 5(c) is introduced acquiring the high level, the COM-MD terminal 28 produces a signal (COM-MD).

Figure 6B:
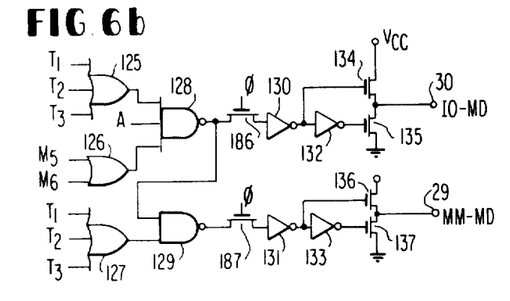

Referring to FIG. 6(b), the output of an OR gate 125 to which are fed state signals $T_1$, $T_2$ and $T_3$, the output of an OR gate 126 to which are fed machine cycle signals $M_5$ and $M_6$, and a signal A for specifying the input-output units 20, 21, are fed to a NAND gate 128, and the output of the NAND gate 128 is fed to the gate electrode of an NMOS transistor 134 via a transfer gate 186 and an inverter 130, and an inverted output which has passed through an inverter 132 is fed to the gate electrode of an NMOS transistor 135. Moreover, each of the collector electrodes of the NMOS transistors 134 and 135 are respectively connected to the positive terminal +Vcc of the power supply and to ground. The emitter electrodes are connected to a terminal 30 to produce an IO-MD signal. The output of an OR gate 127 which receives the signals $T_1$, $T_2$ and $T_3$ is fed to a NAND gate 129 together with the output of the NAND gate 128, and the output of the NAND gate 129 is fed to the gate electrode of an NMOS transistor 136 via a transfer gate 187 and an inverter 131. Further, the output of the inverter 131 is fed to the gate electrode of an NMOS transistor 137 via an inverter 133, and the emitter electrodes of the NMOS transistors 136 and 137 are connected to the terminal 29 to produce an MM-MD signal. When the CPU 17 uses the exclusive bus 23 to transfer the data with respect to the input-output units 20, 21, the signal A for specifying the input-output units 20, 21 acquires the high level, whereby the IO-MD signal is produced from the terminal 30. Further, when the CPU 17 transfers the data with respect to the main memory 19, the MM-MD signal is produced from the terminal 29.

Figure 6C:
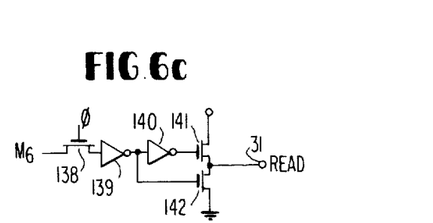

Referring to FIG. 6(c), a machine cycle signal $M_6$ is fed to the gate electrode of an NMOS transistor 142 via a transfer gate 138 and an inverter 139, and the output of the inverter 139 is inverted by an inverter 140 of the next stage and fed to the gate electrode of an NMOS transistor 141. The emitter electrodes of the transistors 141 and 142 are connected to the terminal 31 to produce a READ signal. That is, when the machine cycle signal $M_6$ is of the high level, a READ "0" signal for transferring the data is produced from the CPU 17 and fed to the peripheral equipments. When the machine cycle signal $M_6$ is of the low level, on the other hand, a READ "1" signal is produced to transfer the data from the peripheral equipment to the CPU 17.

Figures 6D, 6E:
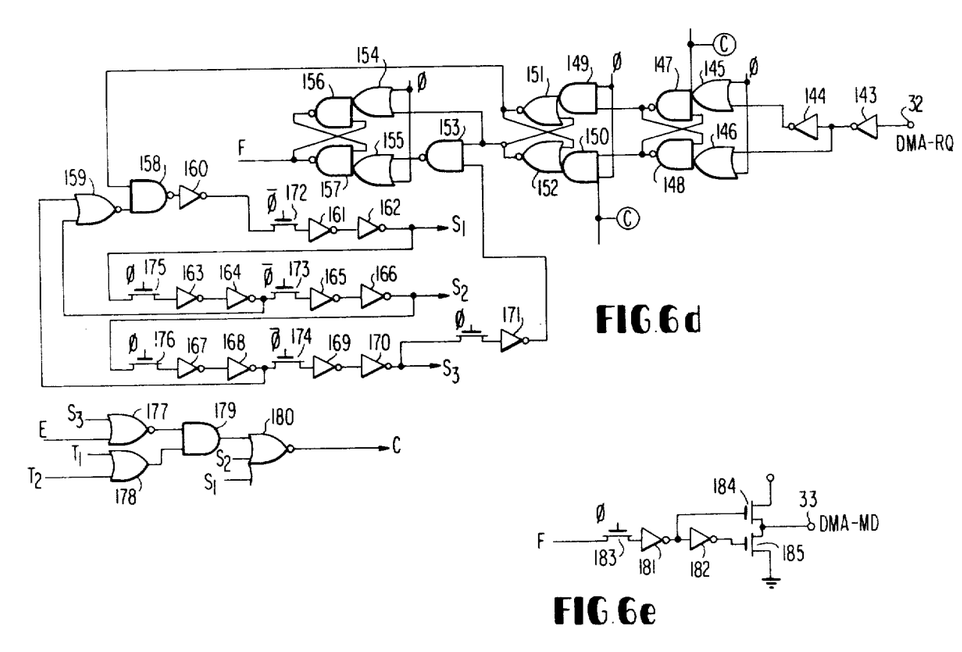

The FIG. 6(d) shows circuit means to produce a permitting signal (DMA-MD) from the peripheral controller by a request signal (DMA-RQ), whereby the CPU 17 gives a permission signal F to permit the use of the exclusive bus 23 for the peripheral units.

The DMA-RQ signal is taken out from the respective output stages of the inverters 143 and 144 connected in series with the terminal 32, and is fed to a flip-flop of the first stage composed of NAND gates 147 and 148 which receive, as inputs, the outputs of the OR gates 145 and 146. Furthermore, the flip-flop of the first stage provides inputs to the AND gates 149 and 150 which are connected to a flip-flop of the second stage composed of NOR gates 151 and 152, and one output thereof is fed to a flip-flop of the third stage composed of NAND gates 156 and 157 which receive the outputs of OR gates 154 and 155. A permission signal (DMA-MD) F corresponding to the DMA-RQ signal is produced from one output terminal of the third stage flip-flop.

The signal F is fed to an inverter 181 via a transfer gate 183 as shown in FIG. 6(e). The output signal of the inverter 181 is fed to the gate electrode of an NMOS transistor 185 via an inverter 182, and the DMA-MD signal is fed from the emitter electrodes of the NMOS transistors 184 and 185 to the peripheral equipment through the terminal 33.

Referring to FIG. 6(d) again, a signal produced by the NOR gate 151 constituting the flip-flop of the second stage is fed to a NAND gate 158. The output of the NAND gate 158 is fed to a shift register of the initial stage constituted by connecting a transfer gate 172 and inverters 161 and 162 in series. Further, four shift registers of the same construction as that of the shift register of the initial stage are connected in series, whereby timing signals $S_1$ to $S_3$ are taken out from the output terminals of the shift registers of odd stages, while the outputs of the shift registers of even stages are fed back to input terminals of a NOR gate 159. The output of the NOR gate 159 is fed to the NAND gate 158. Further, the output of a NOR gate 177 which receives a timing signal $S_3$ and a signal E for specifying the exclusive bus 22, and the output of an OR gate 178 which receives state signals $T_1$, $T_2$, are fed to an AND gate 179, whereby a signal C which rejects the reception of the DMA-RQ signal is produced from the output terminal of a NOR gate 180 which receives the output of the AND gate 179 and the timing signals $S_1$, $S_2$.

The operation of the information processing apparatus according to the embodiment of the present invention is explicitely described below with reference to a timing chart of FIGS. 7(a) and 7(b).

Figure 7A:
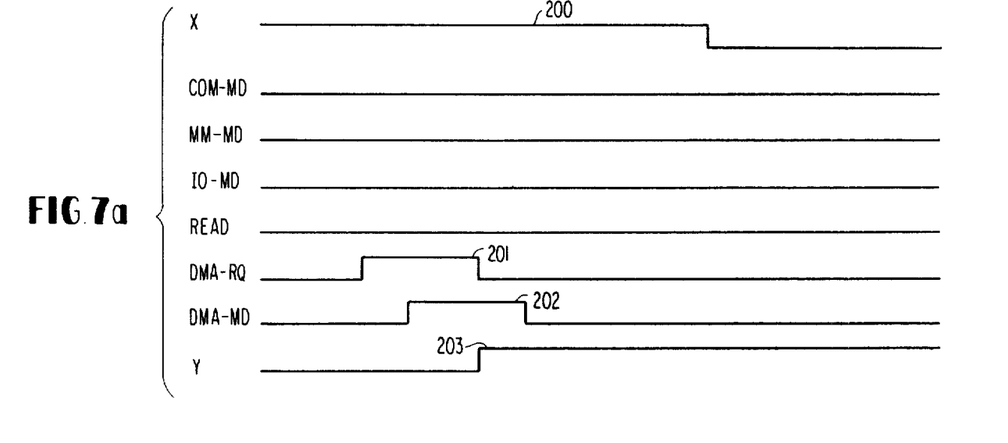
FIGS. 7(a) and (b) are timing charts which show the operation of the information processing apparatus according to the embodiment of the present invention.

FIG. 7(a) shows a timing chart in which the peripheral equipment (for example, input-output unit 20) is storing the data in the main memory 19 through the exclusive bus 23 when the CPU 17 is working the data transmission X with respect to the ROM 18 during a period 200 through the exclusive bus 22. That is, according to FIG. 7(a), none of the signals COM-MD, MM-MD, IO-MD and READ is fed to the terminals 28 to 31 connected to the control unit 38 while the data transmission X is being worked between the CPU 17 and ROM 18 during the period 200. Namely, in this period 200, the common bus is separated into two buses 22 and 23. At this moment, if a signal (DMA-RQ) 201 for demanding the use of the exclusive bus 23 is fed from the input-output unit 20 to the CPU 17 via the terminal 32, the CPU 17 which is not using the exclusive bus 23 can produce a signal (DMA-MD) 202 for permitting the use of the bus from the terminal 33 to the input-output unit 20. Upon receiving the signal 202, the input-output unit 20 stores the data storing Y in the main memory 19 using the exclusive bus 23 in the period 203. That is, the CPU 17 and the input-output unit 20 can execute operations in parallel with each other through the buses 22 and 23.

Figure 7B:
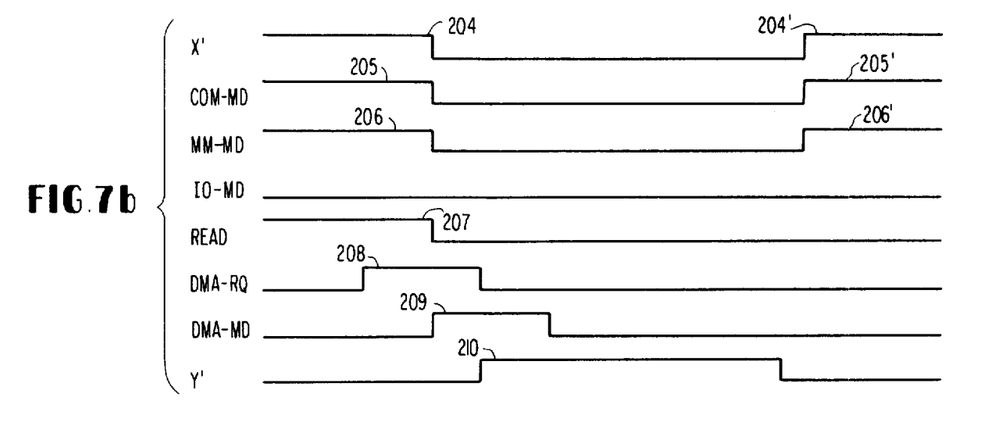

FIG. 7(b) is a timing chart when a DMA-RQ signal for requesting the use of the exclusive bus 23 is produced from the input-output unit 21 while the CPU 17 is receiving the data from the main memory 19 using the exclusive bus 23.

According to FIG. 7(b), while the CPU 17 is executing the operation X' of writing the data from the main memory 19 using the exclusive bus 23 over a period 204, a COM-MD signal 205 is produced from the terminal 28 in FIG. 2. Then, the transfer gate 25 of the drive unit 24 is opened, and the exclusive buses 22a and 23a are connected together, so that the CPU 17 is allowed to transfer the address signals to the main memory 19. On the other hand, the main memory 19 connected to the exclusive bus 23 is selected responsive to the MM-MD signal produced from the terminal 29, and at the same time, the output of the AND gate 35 of the control unit 38 acquires the high level due to a READ signal 207 produced from the terminal 31 in FIG. 2, thereby accessing the transfer gate 27 of the drive unit 24. Consequently, the data stored the main memory 19 is transmitted to the CPU 17. During this period 204, if the CPU 17 receives a signal (DMA-RQ) 208 from the input-output unit 21, the CPU 17 accesses the request signal 208 after a machine cycle which is now being processed is finished and produces a DMA-MD signal 209 to the input-output unit 21 to permit the use of the exclusive bus 23, and then the CPU 17 shuts the transfer gate in the drive unit 24, and separates the common bus into the exclusive bus 22 and the exclusive bus 23. In this condition the input-output unit 21 can transfer the data to the main memory 19 using the exclusive bus 23. After the data has been transferred between the input-output unit 21 and the main memory 19, the CPU 17 resumes the execution of the once interrupted processing 204 as designated at 204'.

As mentioned above, according to the embodiment of the present invention, when the CPU 17 is not using the exclusive bus 23, the peripheral equipment are allowed to transfer the data among themselves as required in parallel with the execution of the processing of the CPU 17. Therefore, it is possible to greatly increase the processing speed of the apparatus.

According to the embodiment of the present invention mentioned above, although the control unit 38 for controlling the drive unit 24 was operated by the CPU 17, it should be noted that the control unit 38 may further be operated by means of a software, an external switch or the like.

Further, although the embodiment of the present invention employed only one drive unit on the common bus to separate or connect the bus, it should be comprehended that a plurality of drive units may be provided on the common bus to divide it into a plurality of exclusive buses. In this case, a plurality of operations can be executed in parallel to sufficiently attain the effects of the present invention.

Figure 8:
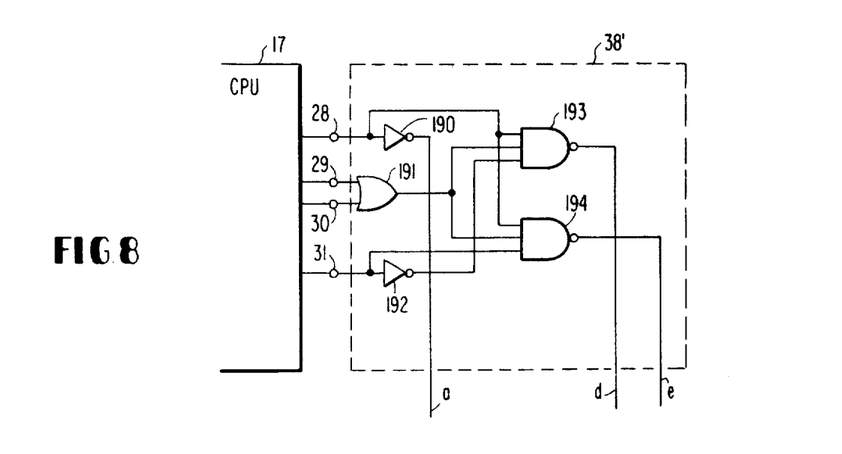
FIG. 8 is a block diagram showing another embodiment of a control unit which may be used in the present invention.

Moreover, although the control unit 38 according to the embodiment of the present invention was so constructed as to be driven by the signals of the high level from the CPU 17, it is also allowable to so construct the control unit 38 as to operate on the signals of the low level as shown in FIG. 8.

In FIG. 8, the terminals 28 to 31 and signal lines a, b and c of the CPU 17 are equivalent to those mentioned with reference to FIG. 2. In this case the COM-MD signal produced from the terminal 28 is fed to the input terminals of NAND gates 193 and 194, and a signal inverted through an inverter 190 is fed to the transfer gate 25 (refer to FIG. 2) of the drive unit through the signal line a. Signals MM-MD and IO-MD produced from the terminals 29 and 30 are introduced into an OR gate 191, and the output of the OR gate 191 is fed to the NAND gates 193 and 194. A READ signal produced from the terminal 31 is fed to the NAND gate 194, and is further fed to the NAND gate 193 via an inverter 192. The output signals of the NAND gates 193 and 194 are respectively fed to the transfer gates 26 and 27 of the drive unit via signal lines d and e.

With the control unit constructed as mentioned above, there will be no need of particularly illustrating that when the signals produced from the terminals 28 to 31 are of the low level, the control unit operates quite in the same manner as illustrated earlier with reference to FIG. 2.

Further, although the drive unit of the present invention is described as including transfer gates, the drive unit may include TTL gates with three-state totem-pole outputs, which have a control input, a data input and a data output.

What is claimed is:

1. An information processing apparatus comprising:
a processor unit for manipulating data under control of programmed instructions;
a read only memory unit for storing said programmed instructions and offering said instructions to said processor unit;
a main memory unit for storing at least one of said data and preset programmed commands;
at least one peripheral unit for receiving or providing at least one of said data and said preset commands;
a common bus coupled to said processor unit, said read only memory unit, said main memory unit and said peripheral units
gating means provided in said common bus for dividing said common bus in response to a divide command so as to separate said processor unit and said read only memory unit from said main memory unit and said peripheral unit, said gating means including transfer gates having on and off states which pass and cut-off (i) said data, (ii) said programmed instructions and (iii) said preset commands in response to said on and off states;
means for detecting said divide command; and
controlling means responsive to an output of said detecting means for controlling said on and off states of said transfer gates.

2. The apparatus of claim 1, in which, when said gating means divides said common bus, at least one of said data and said programmed instruction is transmitted between said processor unit and said read only memory unit, while at least one of said data and said preset commands is transmitted between said main memory unit and said peripheral unit.

3. An information handling apparatus comprising a central processing unit, a read only memory unit storing instructions, a main memory unit storing at least one of data and commands, at least one input-output unit coupled to a peripheral unit, a first transmission path coupled to said central processing unit and said read only memory unit, a second transmission path coupled to said input-output unit and said main memory unit, at least one drive unit provided between said first and said second transmission path to control connection between said first and said second transmission paths, and a control unit for controlling said drive unit, wherein signals are independently transmitted through said first transmission path and through said second transmission path, respectively, when said drive unit does not provide said connection between said first and said second transmission paths.

4. An information processing apparatus comprising: a control processing unit (CPU) including an arithmetic logic unit, a timing generator for producing timing signals, a plurality of registers for storing data, a peripheral controller for controlling an external processing unit, a decoder means for decoding a programmed instruction and a buffer means for storing address information and data information; a read only memory (ROM) for reading out said programmed instruction for said CPU; a random access memory (RAM) for writing in and reading out arithmetic data and command data; an input-output unit for transferring data between said CPU and RAM and an external processing means; a transmission system for connecting said CPU, ROM, and RAM, and input-output unit to each other and having an address signal transferring path and data signal transferring path; at least one transfer gate having "on" and "off" states inserted in said transmission system; and at least one control means for controlling said "on" and "off" states of said transfer gate in response to control signals produced by said peripheral controller.

5. The apparatus according to claim 4, in which the number of said transfer gates is at least two, one inserted in said address signal transferring path and the other inserted in said data signal transferring path.

6. The apparatus according to claim 5, in which at least one of said transfer gates includes a pair of unidirectional gates coupled in parallel and in the opposite directions.

7. The apparatus according to claim 4, in which said transfer gate is inserted in said transmission system so as to separate one group comprising said control processing unit and said read only memory from another group comprising said random access memory and said input-output unit.

8. The apparatus according to claim 7, in which, when said transfer gate separates said one group from said other group, transmissions of at least one of address signals and data signals are independently possible in said one group and said other group.

9. The apparatus according to claim 4, in which said control means is included in said control processing unit.

* * * * *